United States Patent
Hanis et al.

(10) Patent No.: US 10,275,617 B2
(45) Date of Patent: Apr. 30, 2019

(54) OBJECT TRACKING USING ENHANCED VIDEO SURVEILLANCE THROUGH A DISTRIBUTED NETWORK

(71) Applicant: International Business Machines Corporation, Armonk, NY (US)

(72) Inventors: Thomas T. Hanis, Raleigh, NC (US); Bruce H. Hyre, Cary, NC (US); Jessica G. Smith, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/803,863

(22) Filed: Nov. 6, 2017

(65) Prior Publication Data

US 2018/0060617 A1 Mar. 1, 2018

Related U.S. Application Data

(63) Continuation of application No. 14/846,385, filed on Sep. 4, 2015, now Pat. No. 9,811,697.

(51) Int. Cl.
*H04Q 5/22* (2006.01)
*G06K 7/10* (2006.01)
*G06K 19/07* (2006.01)
*G06Q 10/08* (2012.01)

(52) U.S. Cl.
CPC ..... *G06K 7/10297* (2013.01); *G06K 19/0723* (2013.01); *G06Q 10/087* (2013.01)

(58) Field of Classification Search
None
See application file for complete search history.

(56) References Cited

U.S. PATENT DOCUMENTS

| 6,998,987 | B2 | 2/2006 | Ting |
| 8,334,775 | B2 | 12/2012 | Tapp et al. |
| 9,811,697 | B2 | 11/2017 | Hanis et al. |
| 2007/0182818 | A1* | 8/2007 | Buehler ........... G08B 13/19602 348/143 |
| 2011/0096149 | A1 | 4/2011 | Au et al. |

(Continued)

FOREIGN PATENT DOCUMENTS

| EP | 2772048 A1 | 9/2014 |
| WO | 2004051985 A1 | 6/2004 |

(Continued)

OTHER PUBLICATIONS

IBM: List of IBM Patents of Patenty Applications Treated as Related, 2 pg.

(Continued)

*Primary Examiner* — Adolf Dsouza
(74) *Attorney, Agent, or Firm* — Cuenot, Forsythe & Kim, LLC

(57) ABSTRACT

Tracking a tagged object may include receiving, using a first processor, a first video of an object tagged with a radio frequency identification (RFID) tag and first metadata read from the RFID tag. The first metadata may be stored in association with the first video using the first processor. First updated metadata may be written to the RFID tag using the first processor. The first updated metadata may specify at least one of a time the first video is received or a location of the first processor.

15 Claims, 3 Drawing Sheets

(56) References Cited

U.S. PATENT DOCUMENTS

| | | |
|---|---|---|
| 2013/0201337 A1 | 8/2013 | Tapp et al. |
| 2014/0247395 A1 | 9/2014 | Van Belle |
| 2014/0379296 A1 | 12/2014 | Nathan et al. |
| 2015/0116501 A1 | 4/2015 | McCoy et al. |
| 2016/0239696 A1 | 8/2016 | Mats et al. |
| 2017/0068831 A1 | 3/2017 | Hanis et al. |
| 2017/0103238 A1* | 4/2017 | Chadbourne ...... G06K 7/10297 |

FOREIGN PATENT DOCUMENTS

| | | |
|---|---|---|
| WO | 2009002961 A2 | 12/2008 |
| WO | 2012000138 A1 | 1/2012 |

OTHER PUBLICATIONS

Hanis, Thomas T. et al.,"Object Tracking Using Enhanced Video Surveillance Through a Distributed Network," U.S. Appl. No. 14/846,385, filed Sep. 4, 2015, 34 pages.

Shirmohammadi et al., "Distributed Target Tracking Using Delf Localizing Smart Camera Networks." In Proceedings of the Fourth ACM/IEEE International Conference on Distributed Smart Cameras, pp. 17-24. ACM, 2010.

* cited by examiner

US 10,275,617 B2

OBJECT TRACKING USING ENHANCED VIDEO SURVEILLANCE THROUGH A DISTRIBUTED NETWORK

BACKGROUND

The present invention relates to video surveillance. Many systems that provide video surveillance and/or tracking functions are built around the notion of data pedigree. Data pedigree is the record of the ancestry of data items. Data pedigree may include metrics such as estimated reliability of the data items and/or confidence in the data items. One common way of maintaining data pedigree is to create a system in which the data is stored within a large, centralized database. The centralized database allows access to the data to be tightly controlled.

This approach, however, is not without disadvantages. For example, using a large, centralized database may add complexity to the system. Further, all participating entities must be integrated into the same system in order to access the centralized database. In addition, a centralized database may pose a rich target for nefarious activities thereby creating a security risk. One breech of the centralized database may reveal complete tracking information about one or more different tracked objects.

SUMMARY

A method of tracking a tagged object may include receiving, using a first processor, a first video of an object tagged with a radio frequency identification (RFID) tag and first metadata read from the RFID tag. The method may also include storing, using the first processor, the first metadata in association with the first video. The method further may include writing, using the first processor, first updated metadata to the RFID tag responsive to the receiving. The first updated metadata may specify at least one of a time the first video is received or a location of the first processor.

A system for tracking a tagged object may include a first processor programmed to initiate executable operations. The executable operations may include receiving a first video of an object tagged with an RFID tag and first metadata read from the RFID tag. The executable operations may also include storing the first metadata in association with the first video and writing first updated metadata to the RFID tag responsive to the receiving. The first updated metadata may specify at least one of a time the first video is received or a location of the first processor.

A computer program includes a computer readable storage medium having program code stored thereon. The program code is executable by one or more processors to perform a method of tracking a tagged object. The method may include receiving, using a first processor, a first video of an object tagged with an RFID tag and first metadata read from the RFID tag. The method may also include storing, using the first processor, the first metadata in association with the first video. The method further may include writing, using the first processor, first updated metadata to the RFID tag responsive to the receiving. The first updated metadata may specify at least one of a time the first video is received or a location of the first processor.

DETAILED DESCRIPTION

Figure 1:
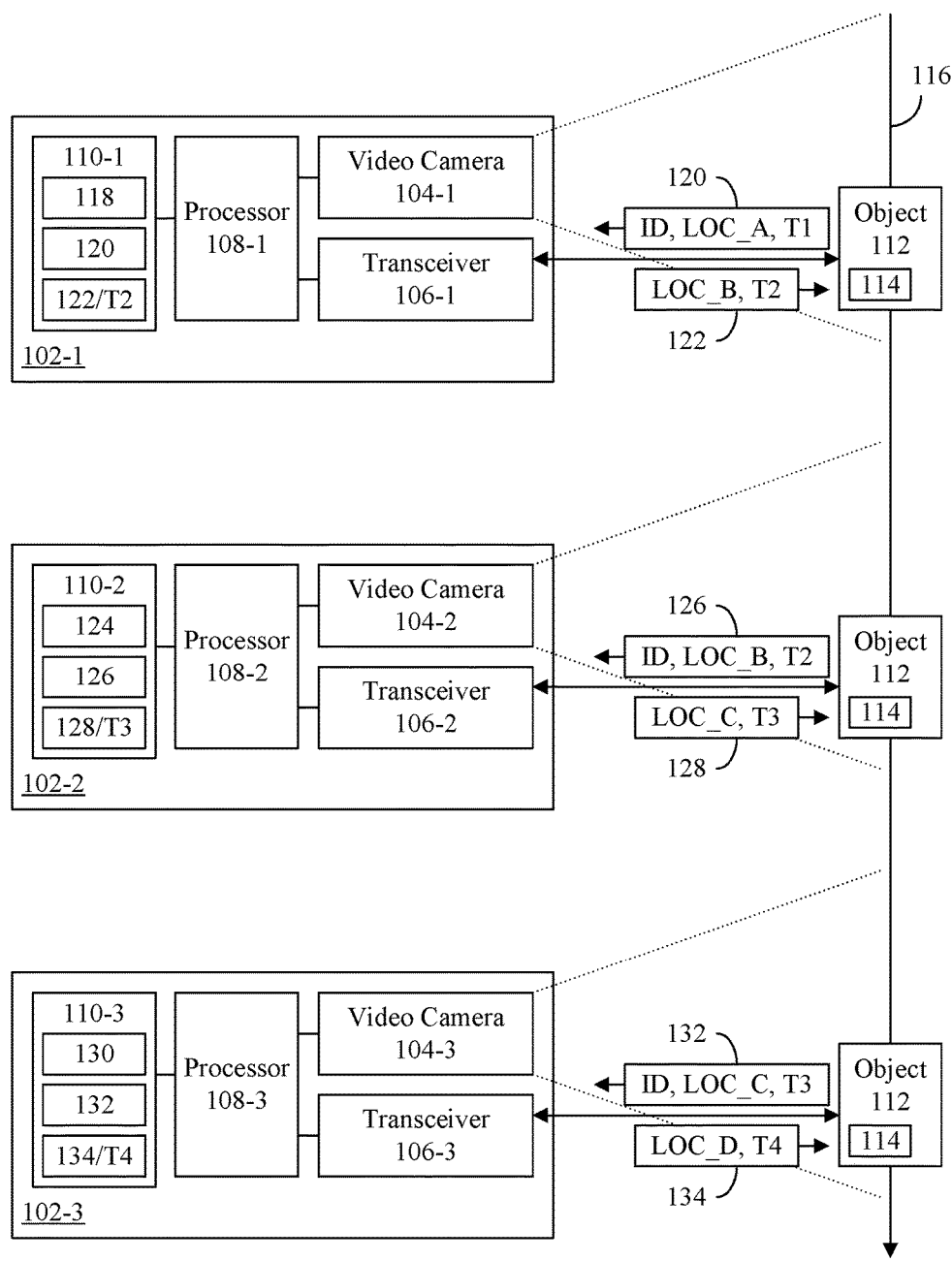
FIG. 1 is a block diagram illustrating an example of a distributed surveillance system.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to object tracking using enhanced video surveillance and, more particularly, to object tracking through a distributed network. In accordance with the inventive arrangements disclosed herein, an object may be tracked through a distributed network of video surveillance devices over time. The object may be tracked without establishing a global or centralized data repository for storing captured video and/or other associated data.

An object may be tagged with a device such as a tag that may be read and written using radio frequency (RF) signals. As the tagged object encounters each security device, the security device may interrogate the tagged object thereby obtaining data from the tag relating to the last, or prior, location of the tagged object. The security device may capture video of the tagged object. Data from the tag may be stored in association with the captured video. The security device may write updated data to the tag on the tagged object specifying information about the current location, time, and/or other data. As the updated data is written to the tag, any data previously written to the tag by another surveillance device, including data just read from the tag, may be overwritten. This means that each tag stores a limited amount of data concerning the movement of a tagged object. In one arrangement, the tag may store only data for the most recent surveillance device encountered by the tag. Since prior stored data is overwritten, capturing the tag yields only information for the most recent surveillance device encountered by the tagged object.

The surveillance devices may be queried to determine a series of links that track, or reconstruct, movement of the tagged object from one surveillance device to another. For example, the surveillance devices may be queried to trace movement of the tagged object back in time as seen and/or detected by one or more different surveillance devices. These surveillance devices may be distributed and may be independent and unaffiliated with one another. Since the need for multiple or all parties to be integrated together through the use of a centralized database may be eliminated, the security risk relating to breach of one surveillance device as a link in the series of links for a given tagged object is minimized and would reveal an incomplete history of whereabouts of the tagged object.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an example of a distributed surveillance system. In this example, the distributed surveillance system includes a plurality of surveillance devices 102-1, 102-2, and 102-3 (collectively referred to as surveillance devices 102). Surveillance devices 102 may include a video camera 104, a transceiver 106, a processor 108, and a data storage device 110. Video cameras 104 may be coupled to processors 108. Transceivers 106 may be coupled to processors 108. Processors 108 may be coupled to data storage devices 110. The various elements of surveillance devices 102 may be coupled by a communication bus, by direct connections, or via other circuitry.

Each of video cameras 104 may be configured to capture video. In one aspect, one or more or all of video cameras 104 may be configured to capture audio in combination with video. For example, video cameras 104 may be equipped with a microphone or other audio transducer. In another aspect, one or more or all of video cameras 104 be configured to capture video without capturing audio.

Video cameras 104, for example, may capture video in a field of view illustrated by the dotted lines for each respective one of video cameras 104. Video cameras 104 may provide videos to processors 108. As defined within this specification, the term "video" means digital video data whether provided as a stream, e.g., using a streaming protocol, as a file, or the like. Video may or may not include audio data depending upon the particular video camera used. Video cameras 104 may capture video digitally. Video cameras 104 may capture analog video that may converted to digital form.

Transceivers 106 may be configured to interrogate (e.g., read) radio frequency identification (RFID) tags and obtain data from the RFID tags referred to herein as metadata. Transceivers 106 may receive radio frequency (RF) signals specifying the metadata. In one aspect, the metadata may be encoded. Transceivers 106 and/or processors 108 may decode the metadata. Transceivers 106 further may be configured to write metadata to the RFID tags. As defined within this disclosure, the term "write," in the context of a transceiver writing to an RFID tag, refers to sending RF signals to the RFID tag thereby storing data in a user data memory of the RFID tag or sending RF signals that, when received by the RFID tag, cause the RFID tag to perform a write operation. It should be appreciated that the particular operations performed when writing will depend upon the particular type of RFID tag technology being used. In any case, transceivers 106 may be configured to send RF signals specifying updated metadata to an RFID tag causing the updated metadata, which may be in encoded form, to be written to the RFID tag. Processors 108 and/or transceivers 106 may be configured to encode updated metadata.

As defined within this disclosure, a "radio frequency identification tag" or "RFID tag" is a device that emits RF energy, may be written (at least in part), and is tracked by an RF-based surveillance device. For example, an RFID tag may be activated by a wireless transmission emitted by a transceiver and, in response, relay, convey, or communicate metadata that may be detected or received by the transceiver. Further, an RFID tag may be activated by a wireless transmission emitted by the transceiver which causes writes updated metadata to the RFID tag or otherwise initiates a write operation of updated metadata to the RFID tag. Data written to the RFID tag may overwrite existing data stored in the RFID tag. In one aspect, an RFID tag may include a unique identifier (ID) such as a serial number that cannot be overwritten. The RFID tags may be active or passive.

In one arrangement, RFID tags used with the distributed surveillance system may include a first memory that stores the ID. The first memory of the RFID tag that stores the ID may be read-only. The ID may be associated with the object to which the RFID tag is coupled or included within. The RFID tag further may include a second memory called a user data memory that may be read and written, e.g., a read-write memory. Transceivers 106 may read the read-only memory of the RFID tags and read and write the user data memory of the RFID tags.

While RFID tags are described as including multiple memories within this disclosure, this terminology is used for ease of description. It should be appreciated that RFID tags may include a single memory where a first portion of the memory is implemented, or partitioned, as read-only and a second portion of the memory is implemented, or partitioned, as read-write (e.g., the user data memory). The inventive arrangements described within this disclosure are not intended to be limited to one particular type of RFID tag or RFID tag memory architecture.

Processors 108 may store videos received from video cameras 104 in data storage devices 110. Processors 108 further may store metadata within data storage devices 110. In one aspect, processors 108 may store metadata in association with a particular video in data storage devices 110. In another aspect, one or more items of metadata may also be stored in data storage devices 110 that may be read by processors 108, provided to transceivers 106, and written to RFID tags by transceivers 106. Data storage device 110 may be any of a variety of different memory devices. For example, data storage device 110 may be a volatile memory such as random access memory (RAM), a non-volatile memory such as a hard disk, solid state drive, or a combination thereof.

In one arrangement, storing metadata in association with a video may mean storing the video and the metadata separately, e.g., as separate files, and associating the metadata with the video through a mechanism such as storing the file in a same directory, associating the items through a stored record such as a table entry, or the like. In another arrangement, storing metadata in association with a video may mean embedding or otherwise including the metadata within, or as part of, the video.

In one example, surveillance devices 102-1, 102-2, and 102-3 may be placed at different locations. The different locations may be within, or part of, a same building, located at different buildings, located indoors, located outdoors, or various combinations thereof. The locations may be part of the same organization or entity, be at or part of different organizations or entities, or the like. In one example, surveillance device 102-1 may be located at an entry of a building, surveillance device 102-2 may be located at an exit of the building, and surveillance device 102-3 may be located at a different building that is part of a different organization. In any case, for purposes of illustration, an object 112 having an RFID tag 114 coupled thereto and/or fixed inside may be moved on a path 116 that enters and exits the detectable ranges of each of surveillance devices 102. A detectable range may be an area of overlap between a field of view of a video camera 104 with a read-write range of a transceiver 106 of a same surveillance device 102.

Video cameras 104 may start recording video responsive to any of a variety of different events. For example, the event may be detected motion, an object entering the field of view of video cameras 104, detection of an RFID tag by transceivers 106 in the same surveillance system, a combination of both, or the like. Video cameras 104 may discontinue recording responsive to any of a variety of further events such as the passage of a predetermined amount of time, lack of motion in the field of view, the detected object leaving the field of view, or the like. In still another arrangement, video cameras 104 may continually record video, e.g., on a loop, and only a portion of video may be saved responsive to one or more events such as those described above. It should be appreciated that the recording and/or streaming of video by video cameras 104 may started and/or stopped in any of a variety of different ways and that the particular way in which the recording of video is started, stopped, and/or provided to processors 108 is not intended as a limitation of the inventive arrangement described within this disclosure.

In one example, object 112 may pass within the detectable range of surveillance device 102-1. Accordingly, video camera 104-1 may capture and generate video 118 of object 112. Video camera 104-1 may provide video 118 including object 112 to processor 108-1. Processor 108-1 may store video 118 in data storage device 110-1. Transceiver 106-1 may detect, or read, RFID tag 114. Transceiver 106-1 may receive one or more RF signals specifying metadata 120. Metadata 120 may include the ID (i.e., the unique identifier for RFID tag 114) that is associated with object 112, a location (LOC_A), and a time (T1). Processor 108-1 may receive metadata 120 from transceiver 106-1 and store metadata 120 within data storage device 110-1 in association with video 118.

In one exemplary implementation, the term "location," in reference to a location within metadata as read from, or written to, an RFID tag, may mean global positioning system (GPS) coordinates such as latitude and longitude. In another exemplary implementation, the term "time," in reference to a time within metadata, may mean a date and time. In one example, time may be specified as a timestamp using ISO 8601 format.

As discussed, RFID tag 114 may include a read-only memory and a user data memory that is read-write. Transceiver 106-1 may read the ID of metadata 120 from the read-only memory of RFID tag 114. Other data such as location LOC_A and time T1 may be read from the user data memory of RFID tag 114. Data read from the user data memory of RFID tag 114 is written by a prior surveillance device having detected RFID tag 114. For example, location LOC_A is the location of the prior surveillance device and time T1 is the time that RFID tag 114 was detected by the surveillance device located at location LOC_A.

In one aspect, responsive to receiving video 118 and/or metadata 120, processor 108-1 may write data to RFID tag 114. Processor 108-1, for example, may instruct transceiver 106-1 to send updated metadata 122 to RFID tag 114 as one more RF signals. Updated metadata 122 may include a location LOC_B of surveillance system 102-1 and a time T2 that video 118 was obtained or received. Transceiver 106-1 may transmit updated metadata 122 to RFID tag 114. The write operation that is initiated overwrites the data stored in the user data memory of RFID tag 114. For example, the user data memory of RFID tag 114, subsequent to the write operation initiated by surveillance device 102-1, specifies location LOC_B and time T2. The prior data of location LOC_A and time T1 is overwritten.

Processor 108-1 further may store updated metadata 122 in data storage device 110-1 in association with video 118 and/or metadata 120. In another aspect, however, processor 108-1 may only store the time T2 as opposed to the entirety of updated metadata 122 in association with video 118 and/or metadata 120. For example, time T2, video 118, and metadata 120 may be stored as an entry within a data structure such as a table or database.

Object 112 may continue on path 116 and, subsequently, pass within the detectable range of surveillance device 102-2. As such, video camera 104-2 may capture and generate video 124 of object 112. Video camera 104-2 may provide video 124 including object 112 to processor 108-2. Processor 108-2 may store video 124 in data storage device 110-2. Transceiver 106-2 may detect, or read, RFID tag 114. Transceiver 106-2 may receive one or more RF signals specifying metadata 126. Metadata 126 may include the ID of RFID tag 114 that is associated with object 112 and updated metadata 122 previously written to the user data memory of RFID tag 114. For example, metadata 126 may include the ID, location LOC_B, and time T2. Processor 108-2 may receive metadata 126 from transceiver 106-2 and store metadata 126 within data storage device 110-2 in association with video 124.

In the example of FIG. 1, transceiver 106-2 may read the ID of metadata 126 from the read-only memory of RFID tag 114. Transceiver 106-2 may read other data such as location LOC_B and time T2 from the user data memory of RFID tag 114. The location and/or time read from the user data memory of RFID tag 114 by surveillance system 102-2 is the location and time (e.g., updated metadata 122) written to the user data memory of RFID tag 114 by surveillance system 102-1.

Responsive to receiving video 124 and/or metadata 126, processor 108-2 may write data to RFID tag 114. Processor 108-2, for example, may instruct transceiver 106-2 to send updated metadata 128 to RFID tag 114 as one or more RF signals. Updated metadata 128 may include a location LOC_C of surveillance system 102-2 and a time T3 that video 124 was obtained or received. Transceiver 106-2 may transmit updated metadata 128 to RFID tag 114. The write operation that is initiated overwrites the data stored in the user data memory of RFID tag 114. For example, the user data memory of RFID tag 114, subsequent to the write operation being initiated by surveillance system 102-2, specifies location LOC_C and time T3 (e.g., updated metadata 128). The prior data of location LOC_B and time T2 (updated metadata 122) is overwritten.

Processor 108-2 further may store updated metadata 128 in data storage device 110-2 in association with video 124 and/or metadata 126. In another aspect, however, processor 108-2 may only store the time T3 as opposed to the entirety of updated metadata 128 in association with video 124 and/or metadata 126. For example, time T3, video 124, and metadata 126 may be stored as an entry within a data structure such as a table or database.

Object 112 may continue on path 116 and, subsequently, pass within the detectable range of surveillance device 102-3. As such, video camera 104-3 may capture and generate video 130 of object 112. Video camera 104-3 may provide video 130 including object 112 to processor 108-3. Processor 108-3 may store video 130 in data storage device 110-3. Transceiver 106-3 may detect, or read, RFID tag 114. Transceiver 106-3 may receive one or more RF signals specifying metadata 132. Metadata 132 may include the ID of RFID tag 114 and updated metadata 128, which specifies location LOC_C and time T3. Processor 108-3 may receive metadata 132 from transceiver 106-3 and store metadata 132 within data storage device 110-3 in association with video 130.

In the example of FIG. 1, transceiver 106-3 may read the ID of metadata 132 from the read-only memory of RFID tag 114. Transceiver 106-3 may read other data such as location LOC_C and time T3 (e.g., updated metadata 128) from the user data memory of RFID tag 114. The location and/or time read from the user data memory of RFID tag 114 by surveillance device 102-3 is the location and time written to the user data memory of RFID tag 114 by surveillance device 102-2.

Responsive to receiving video 130 and/or metadata 132, processor 108-3 may write data to RFID tag 114. Processor 108-3, for example, may instruct transceiver 106-3 to send updated metadata 134 to RFID tag 114 as one or more RF signals. Updated metadata 134 may include a location LOC_D of surveillance system 102-3 and a time T4 that video 130 was obtained or received. Transceiver 106-3 may transmit updated metadata 134 to RFID tag 114. The write operation that is initiated overwrites the data stored in the user data memory of RFID tag 114. For example, the user data memory of RFID tag 114, subsequent to the write operation being initiated by surveillance system 102-3, specifies updated metadata 134 which includes location LOC_D and time T4. The prior data of location LOC_C and time T3 (updated metadata 128) is overwritten.

Processor 108-3 further may store updated metadata 134 in data storage device 110-3 in association with video 130 and/or metadata 132. In another aspect, however, processor 108-3 may only store the time T4 as opposed to the entirety of updated metadata 134 in association with video 130 and/or metadata 132. For example, time T4, video 130, and metadata 132 may be stored as an entry within a data structure such as a table or database.

FIG. 1 illustrates an exemplary technique for tracking a tagged object using enhanced video surveillance. For purposes of illustration, consider the following example. Object 112 having RFID tag 114 may be observed to entering a place of employment at a particular entrance corresponding to surveillance device 102-1 and location LOC_B at time T1. Object 112 may be observed leaving the place of employment through an exit at a different location corresponding to surveillance device 102-2 and location LOC_C at time T3. Object 112 may later be observed on a city street in front of a business establishment corresponding to surveillance device 102-3 at location LOC_D at time T4. Each surveillance device stores a portion of path 116 as traveled by object 112 and RFID tag 114.

Subsequently, path 116 may be recovered by querying surveillance devices 102. For example, the data logs of surveillance device 102-3 may be evaluated to determine that object 112 arrived at location LOC_D at time T4 and from location LOC_C. Object 112 was detected at location LOC_C at time T3. Accordingly, the logs of surveillance device 102-2 may be evaluated to determine that object 112 traveled to location LOC_C from location LOC_B and that object 112 was at location LOC_B at time T2. Using this technique, the path of an object may be reconstructed or tracked.

Within FIG. 1, surveillance devices 102 are illustrated as integrated systems where the various elements described are shown as part of a single housing. It should be appreciated, however, that one or more or all of surveillance devices 102 may be implemented in a distributed manner. For example, one or more or each of video cameras 104, transceivers 106, processors 108, and/or data storage devices 110 may be implemented as individual and/or discrete elements that are communicatively linked or otherwise coupled to form a surveillance device. In one aspect, for example, video camera 104 and/or transceiver 106 may be implemented as peripheral devices coupled to a data processing system that includes processor 108 and/or data storage device 110.

Figure 2:
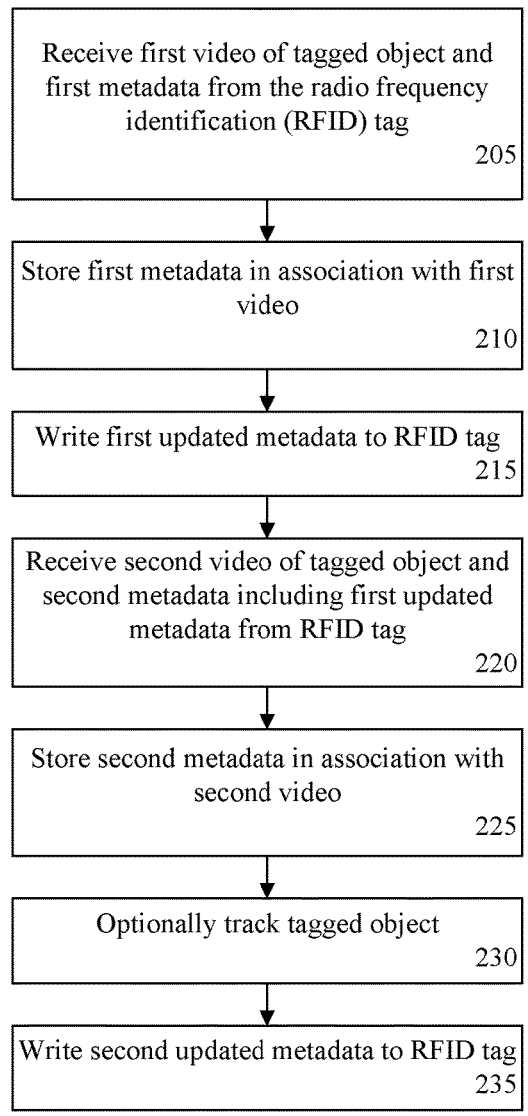
FIG. 2 is a flow chart illustrating an exemplary method of tracking a tagged object.

FIG. 2 is a flow chart illustrating an exemplary method 200 of tracking a tagged object. Method 200 may be implemented by a distributed surveillance system including a plurality of surveillance devices as generally described with reference to FIG. 1. For ease of discussion, the object being tracked is coupled to and/or includes an RFID tag and is referred to as the "tagged object." The RFID tag may be a read-write RFID tag that includes a read-only memory and a read-write memory referred to as a user data memory. As noted, while the read-only memory and the user data memory are referred to individually as memories, the memories may be a part, e.g., a partition, of a same memory with read and write protections in place as described. Method 200 may begin in a state where the tagged object has entered the detectable range of a first surveillance device.

In block 205, the first surveillance device may receive first video of the tagged object and first metadata read from the RFID tag. In one aspect, the first metadata may include the ID of the RFID tag, a location, and optionally a time. The location may be the location of a surveillance device the tagged object passed in detectable range of immediately prior to passing in detectable range of the first surveillance device. The time may be the time that the tagged object was detected by the prior surveillance device.

In one arrangement, video and metadata may be received by a surveillance device or the processor of the surveillance device substantially concurrently. As defined within this specification, the term "substantially concurrently," in reference to the receipt of video and metadata, means that the video and the metadata are received responsive to the tagged object entering the detectable range of the surveillance system or within a predetermined amount of time of the tagged object entering the detectable range of the tagged object.

In another arrangement, the user data memory of the RFID tag may store additional data that may be read and/or written. For example, within the user data memory of the RFID tag, data such as direction (or directionality), addresses, names, security information to assist with notifications and/or tampering, and the like may be written and/or read in addition to the data items previously noted. Examples of direction may be "incoming," "outgoing," "north," "east," "west," "south," or the like describing the motion of the tagged object. Examples of names may include building names such as "Library East," "Library West," particular exit and/or entry names, area names, or the like.

In block 210, the first surveillance device may store the first metadata in association with the first video in a memory or other data storage device. In storing the first metadata and the first video, the first surveillance device may also store the time that the first video was received and/or the location of the first surveillance device.

In block 215, the first surveillance device may write data to the RFID tag. The first surveillance device may initiate a write operation of first updated metadata to the RFID tag. In one aspect, the first surveillance device may write the RFID tag with the first updated metadata responsive to receiving the first video. The first updated metadata may include the time that the first video was received by the first surveillance device and the location of the first surveillance device. In one aspect, the time of receipt and location may be the time that a processor of the first surveillance device receives the first video and the location of the processor of the first surveillance device. The write operation initiated by the first surveillance device may overwrite the user data memory of the RFID tag. In one aspect, the entirety of the user data memory of the RFID tag may be overwritten. As such, any of the first metadata read from the user data memory of the RFID tag is deleted by overwriting the user data memory of the RFID tag with the first updated metadata.

Method 200 may continue to block 220, where the tagged object has been moved to a different location within the detectable range of a second surveillance device. Accordingly, in block 220, the second surveillance device may receive second video of the tagged object and second metadata from the RFID tag. The second metadata may include the first updated metadata written by the first surveillance device. For example, the second metadata may include the ID of the RFID tag, the location of the first surveillance device, and the time that the first video was received by the first surveillance device. As such, the time indicates when the tagged object was detected by the first surveillance device.

In block 225, the second surveillance device may store the second metadata in association with the second video in a memory or other data storage device. In storing the second metadata and the second video, the second surveillance device may also store the time that the second video was received and/or the location of the second surveillance device.

In block 230, the second surveillance device, or another system, may optionally track the tagged object. The tagged object may be tracked by evaluating the second metadata. The second metadata, for example, specifies the prior location where the tagged object was detected corresponding to the first surveillance device and the time. Further information about the path taken by the tagged object may be obtained by retrieving the video and associated metadata stored in the first surveillance system for the tagged object using the ID as a reference. The process may continue tracing links back in time to retrace the route of the tagged object.

In block 240, the second surveillance device may write data to the RFID tag. The second surveillance device may initiate a write operation of second updated metadata to the RFID tag. In one aspect, the second surveillance device may write the RFID tag with the second updated metadata responsive to receiving the second video. The second updated metadata may include the time that the second video was received by the second surveillance device and the location of the second surveillance device. In one aspect, the time of receipt and location may be the time that a processor of the second surveillance device receives the second video and the location of the processor of the second surveillance device. The write operation initiated by the second surveillance device may overwrite the user data memory of the RFID tag. As noted, the entirety of the user data memory of the RFID tag may be overwritten. As such, any of the second metadata (e.g., the first updated metadata) read from the user data memory of the RFID tag is deleted by overwriting the user data memory of the RFID tag with the second updated metadata.

The examples described with reference to FIGS. 1 and 2 are provided for purposes of illustration. It should be appreciated that fewer or more surveillance devices may be included in a distributed surveillance system. As such, the inventive arrangements described within this disclosure are not intended to be limited by the particular number of surveillance devices shown.

In the case where a surveillance device is the first to write to an RFID tag, it should be appreciated that the user data memory of the RFID tag, when read, will be initially blank or include default data. As such, the metadata stored in association with the video captured by the surveillance device may not specify a time or location of a prior surveillance device.

Figure 3:
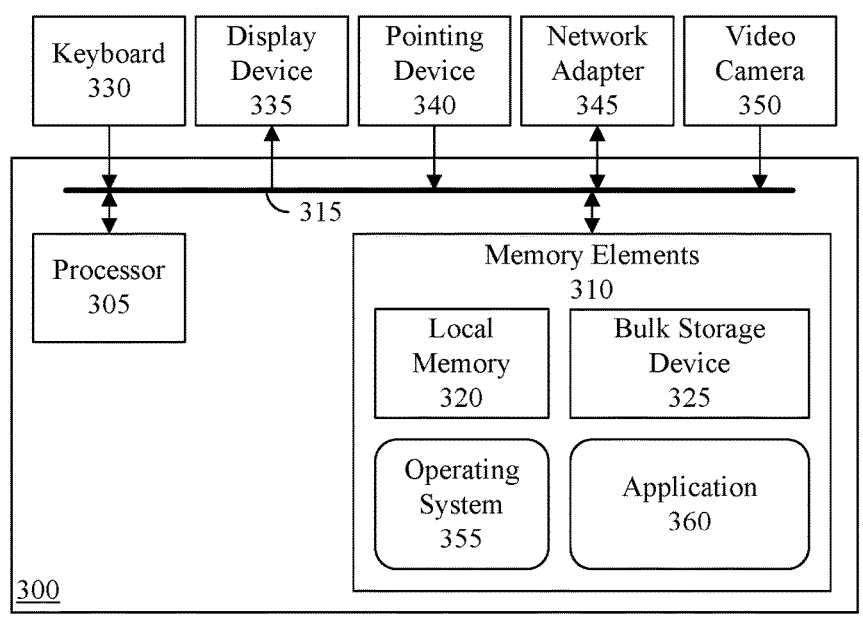
FIG. 3 is a block diagram illustrating an example of a surveillance device for use with the distributed surveillance system of FIG. 1.

FIG. 3 is a block diagram illustrating an example of a surveillance device 300 that may be used with the distributed surveillance system of FIG. 1. Surveillance device 300 and one or more others having a same or similar architecture to that of FIG. 3 may implement the operations described with reference to FIG. 2.

As pictured, surveillance device 300 may include at least one processor (e.g., a central processing unit) 305 coupled to memory elements 310 through a system bus 315 or other suitable circuitry. As such, surveillance device 300 may store program code (e.g., computer readable program instructions) within memory elements 310. Processor 305 executes the program code accessed from memory elements 310 via system bus 315 or the other suitable circuitry.

Memory elements 310 include one or more physical memory devices such as, for example, local memory 320 and one or more bulk storage devices 325. Local memory 320 refers to RAM or other non-persistent memory device(s) generally used during actual execution of the program code. Bulk storage device(s) 325 may be implemented as a hard disk drive (HDD), solid state drive (SSD), or other persistent data storage device. Surveillance device 300 also may include one or more cache memories (not shown) that provide temporary storage of at least some program code in order to reduce the number of times program code must be retrieved from bulk storage device 325 during execution.

Input/output (I/O) devices such as a keyboard 330, a display device 335, and a pointing device 340 optionally may be coupled to surveillance device 300. I/O devices such as one or more network adapters 345 may also be coupled to surveillance device 300 to enable surveillance device 300 to become coupled to other systems, computer systems, remote printers, and/or remote storage devices through intervening private or public networks. Modems, cable modems, wireless transceivers, and Ethernet cards are examples of different types of network adapters 345 that may be used with surveillance device 300. For example, network adapter 345 may implement a transceiver used to read and/or write to an RFID tag. Surveillance device 300 further may be coupled to an I/O device such as video camera 350. The I/O devices may be coupled to surveillance device 300 either directly or through intervening I/O controllers.

As pictured in FIG. 3, memory elements 310 may store an operating system 355 and an application 360. Operating system 355 and application 360, being implemented in the form of executable program code, are executed by surveillance device 300 and, as such, may be considered an integrated part of surveillance device 300. In another arrangement, surveillance device 300 may include operational program code that combines operating system 355 and application 360 as an integrated application, e.g., as in the case of some embedded systems. Any data items, parameters, and/or attributes utilized by processor 305 as discussed herein, including operating system 355 and/or application 360, are functional data structures that impart functionality when employed as part of surveillance device 300.

Processor 305, in executing operating system 355 and/or application 360, may be programmed to perform and/or initiate the various operations described within this disclosure. For example, processor 305 may receive video from video camera 350 and metadata via network adapter 345. Processor 305 may store the video and metadata and within memory element 310 as described herein. Further, processor 305 may direct network adapter 345 to write updated metadata to an RFID tag as described herein.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of tracking an object tagged with a radio frequency identification tag (RFID), comprising:
   receiving, by a first hardware processor, a first video of the object and first metadata read from the RFID tag;
   storing, to a first storage device, the first metadata in association with the first video; and
   writing, responsive to the receiving the first video and the first metadata and by the first hardware processor, second metadata to the RFID tag that overwrites the first metadata, wherein
   the second metadata specifies a time the first hardware processor received the first video of the object and a location of the first hardware processor, and
   the first metadata specifies a time a prior processor received a prior video of the object and a location of the prior processor.

2. The method of claim 1, wherein
   a second hardware processor receives a second video of the object and the second metadata read from the RFID tag,
   the second processor stores to a second storage device separate from the first storage device the second metadata in association with the second video, and
   the second processor writes third metadata to the RFID tag that overwrites the third metadata.

3. The method of claim 1, wherein
   the first and second metadata each include a location and a time.

4. The method of claim 1, wherein
   the first video and the first metadata are received substantially concurrently.

5. The method of claim 1, wherein
the writing the second metadata overwrites a user data memory of the RFID tag.

6. A computer hardware system configured to track an object tagged with a radio frequency identification tag (RFID), comprising
a first hardware processor programmed to initiate the following executable operations:
receiving, by the first hardware processor, a first video of the object and first metadata read from the RFID tag;
storing, to a first storage device, the first metadata in association with the first video; and
writing, responsive to the receiving the first video and the first metadata and by the first hardware processor, second metadata to the RFID tag that overwrites the first metadata, wherein
the second metadata specifies a time the first hardware processor received the first video of the object and a location of the first hardware processor, and
the first metadata specifies a time a prior processor received a prior video of the object and a location of the prior processor.

7. The system of claim 6, wherein
a second hardware processor receives a second video of the object and the second metadata read from the RFID tag,
the second processor stores to a second storage device separate from the first storage device the second metadata in association with the second video, and
the second processor writes third metadata to the RFID tag that overwrites the third metadata.

8. The system of claim 6, wherein
the first and second metadata each include a location and a time.

9. The system of claim 6, wherein
the first video and the first metadata are received substantially concurrently.

10. The system of claim 6, wherein
the writing the second metadata overwrites a user data memory of the RFID tag.

11. A computer program product, comprising
a hardware storage device having a computer readable storage medium that stores a program code for tracking an object tagged with a radio frequency identification tag (RFID),
the program code, which when executed by a computer hardware system, causes the computer hardware system to perform:
receiving, by a first hardware processor, a first video of the object and first metadata read from the RFID tag;
storing, to a first storage device, the first metadata in association with the first video; and
writing, responsive to the receiving the first video and the first metadata and by the first hardware processor, second metadata to the RFID tag that overwrites the first metadata, wherein
the second metadata specifies a time the first hardware processor received the first video of the object and a location of the first hardware processor, and
the first metadata specifies a time a prior processor received a prior video of the object and a location of the prior processor.

12. The computer program product of claim 11, wherein
a second hardware processor receives a second video of the object and the second metadata read from the RFID tag,
the second processor stores to a second storage device separate from the first storage device the second metadata in association with the second video, and
the second processor writes third metadata to the RFID tag that overwrites the third metadata.

13. The computer program product of claim 11, wherein
the first and second metadata each include a location and a time.

14. The computer program product of claim 11, wherein
the first video and the first metadata are received substantially concurrently.

15. The computer program product of claim 11, wherein
the writing the second metadata overwrites a user data memory of the RFID tag.

* * * * *